United States Patent
Eichhorn et al.

(10) Patent No.: US 6,795,570 B1
(45) Date of Patent: Sep. 21, 2004

(54) PROCESS AND APPARATUS FOR THE ELECTRONIC RECORDING OF AN IMAGE

(75) Inventors: Torsten Eichhorn, Jena (DE); Ralph Leszmann, Jena (DE); Andreas Meister, Jena (DE); Joerg Standau, Jena (DE)

(73) Assignee: Smiths Heimann Biometrics GmbH, Jena (DE)

( * ) Notice: Subject to any disclaimer, the term of this patent is extended or adjusted under 35 U.S.C. 154(b) by 0 days.

(21) Appl. No.: 09/582,977
(22) PCT Filed: Nov. 5, 1999
(86) PCT No.: PCT/EP99/08471
§ 371 (c)(1), (2), (4) Date: Jul. 7, 2000
(87) PCT Pub. No.: WO00/28470
PCT Pub. Date: May 18, 2000

(30) Foreign Application Priority Data

Nov. 9, 1998 (DE) .......................... 198 51 544

(51) Int. Cl.$^7$ .............................. G06K 9/00; G06K 9/20
(52) U.S. Cl. .......................... 382/124; 382/127; 356/71
(58) Field of Search ................................ 382/124, 125, 382/126, 127; 356/71

(56) References Cited

U.S. PATENT DOCUMENTS

| | | | | |
|---|---|---|---|---|
| 4,553,837 A | * | 11/1985 | Marcus ......................... | 356/71 |
| 4,933,976 A | * | 6/1990 | Fishbine et al. ............. | 382/127 |
| 5,230,025 A | * | 7/1993 | Fishbine et al. ............. | 382/127 |
| 5,548,394 A | * | 8/1996 | Giles et al. .................... | 356/71 |
| 5,748,766 A | * | 5/1998 | Maase et al. ................ | 382/124 |

FOREIGN PATENT DOCUMENTS

WO          WO 97/41528          11/1997

* cited by examiner

Primary Examiner—Leo Boudreau
Assistant Examiner—Duy M. Dang
(74) Attorney, Agent, or Firm—Reed Smith LLP (57) ABSTRACT

A process is disclosed for the electronic recording of an image of the surface of an object, which image can be displayed as a function G(x, y), wherein x and y are the coordinates of a respective image point of the image and G designates its gray value, wherein the object is recorded sequentially over different times $t_i$, where $t_{i+1}>t_i$, from different perspectives as function $G_i$ in order to form the total image G from the individual images $G_i(x, y)$ such as when rolling a finger for recording a fingerprint, wherein portions are cut out of the individual images and joined together depending on the respective recorded view, wherein a curved intersection line is determined for defining the portions of every image aside from the first image $G_i$ by comparison with the image content of the previously recorded or assembled image $G_{i-1}$, wherein the portion of the image $G_{i-1}$ is defined by this curved intersection line and the corresponding portion of the image $G_i$ is subsequently added to this intersection line to form the total image G (x, y), wherein this intersection line is determined by forming a similarity function $G_c(x, y)$ between the images $G_i$ and $G_{i-1}$, which similarity function $G_c(x, y)$ is external with identical gray values at identical image point coordinates or also by including their surroundings, and the intersection line is formed by a curve y (x) which runs through at least one extreme with a very high similarity of the similarity function $G_c(x, y)$.

12 Claims, 4 Drawing Sheets

```
/*   Initializing of the first line of the sum field   */
for ( x=0; x<W; x++ ) {
   sum[0][x] = coeff[0][x];
}

/*   Linewise updating of the sums and precursors   */
for( y=1; y<H; y++ ) {
   for( x=0; x<W; x++ ) {
      if( sum[y-1][x-1] < sum[y-1][x+1] ) {
         xmin = x-1;
      } else {
         xmin = x+1;
      }
      min = sum[y-1] [xmin];
      if( sum[y-1] [x] <= min ) {
         xmin = x;
         min = sum[y-1] [xmin];
      }
      sum[y][x] = coeff[y][x] + min;
      pred[y][x] = xmin;
   }
}
/*   Minimum search in the bottom line */
xmin = 0 ;
min = sum[H-1][xmin];
for( x=1; x<W; x++ ) {
   if( sum[H-1][x] < min ) {
      xmin = x;
      min = sum[H-1][xmin];
   }
}
path[H-1] = xmin;

/*   Tracing back the path course   */
for( y=H-1; y>0; y-- ) {
   path[y-1] = pred[y][ path[y] ];
}
```

Fig. 4

PROCESS AND APPARATUS FOR THE ELECTRONIC RECORDING OF AN IMAGE

BACKGROUND OF THE INVENTION a) Field of the Invention

The invention is directed to a process for the electronic recording of an image of the surface of an object, which image can be displayed as a function G(x, y), wherein x and y are the coordinates of a respective image point of the image and G designates its gray value, wherein the object is recorded sequentially over different times $t_i$, where $t_{i+1} > t_i$, from different perspectives as function $G_i$ in order to form the total image G from the individual images $G_i(x, y)$ such as when rolling a finger for recording a fingerprint, wherein portions are cut out of the individual images and joined together depending on the respective recorded view. The invention is further directed to an apparatus with a device for the electronic recording of an image of the surface of an object, which image can be displayed as image points by a function G(x, y), wherein x and y are the coordinates of the respective image point with an assigned gray value G, and with a device by which the object is imaged sequentially over different times $t_i$ where $t_{i+1} > t_i$, from different perspectives as function $G_i$ in order to form the total image $G_i$ from the individual images $G_i(x, y)$ such as when rolling a finger for the recording of a fingerprint, and an electronic image processing device whose circuit is designed to cut portions out of the individual images and join them together depending on the respective recorded view. The invention is further directed to a use of the process in an arrangement of the type described above.

b) Description of the Related Art

While image acquisition of flat images is presently carried out in a standard manner, there has been an increasing interest within technical circles in the imaging of three-dimensional bodies. Examples of applications in this respect include the recording of three-dimensional bodies in three spatial dimensions or two surface dimensions. These applications include tomography in the field of medicine and, in the consumer branch, automatic acquisition of human body dimensions for computer-assisted manufacture of tailor-cut clothing.

With techniques of these types, It is known to image a body from a plurality of views, wherein, in particular, an image recording device is guided around the body. In so doing, a plurality of recordings are made and the three-dimensional image of the body or the two-dimensional developed view of the surface is then reconstructed from these recordings in a computer.

The recording of the surface of a finger for acquiring fingerprints in criminology or for future applications for personal identification in security systems is more difficult.

The identification of persons has recently become a focus of interest in a computer technology. In the last year, for example, COMPAQ has offered computers which determine a numerical code from a fingerprint which can be used instead of a password for access to the Internet or for identification when making purchases on the Internet. For this purpose, the lines of the finger are determined by placing the finger on a sensor.

Compared with the examples mentioned above, the recording of fingerprints is particularly problematic. Because of the elasticity of the finger, the relevant lines of the finger can be displaced in the different recordings of the fingerprints, so that unique association is rendered dubious without special steps for classification.

For this reason, but also because of legal restrictions in most countries, it is attempted in criminology to record fingerprints in such a way that the technique of inking the finger to be recorded and rolling it on paper is simulated as far as possible. In so doing, a glass plate is usually used instead of paper, light being radiated onto the glass plate under total reflection conditions. When the finger is rolled, the lines of the finger interfere with total reflection due to their contact with the glass plate, so that the points of support are dark, resulting in a situation optically similar to that of a finger rolled on paper. The image occurring with different light intensities due to the total reflection is then electronically recorded and evaluated.

Although the process and apparatus which will be shown in more detail in the following can also be used for other applications such as those mentioned above by way of example, the following constructions are essentially directed to fingerprinting technique because the resulting set of problems in acquiring a curved surface can be shown especially clearly in this case.

During the rolling for electronic recording of individual images, recordings are made at determined times, so that the total image exists in steps as partial images of the rolling process, whereas a continuous imaging is carried out when recording on paper. The stepwise recording leads to the problem of deciding how to assemble the images. A simple assembly of the individual images is generally impossible because the finger deforms when rolled and even the structure of the lines of the finger changes when rolling. Similar problems also occur in tomography when the patient moves. Further, this is also true in the case of manufacturing tailored clothing by means of computers when the customer does not keep still. But this set of problems is particularly pronounced in the recording of fingerprints.

Known methods for reconstructing a total surface from individual images are known from U.S. Pat. No. 4,933,976, U.S. Pat. No. 5,230,025 and WO 97/41528. According to the teachings of these patents, a strip is removed the individual images and the total image is assembled from these strips. The cited patents differ from one another with respect to the different algorithms by which the strip boundary is determined in order, as far as possible, to join only parts of the individual images that correspond to the supporting surface of the finger. However, distorted or corrupted images can only be taken into account to a limited extent in the computing methods indicated in this case.

Inspection of the images recorded by these different methods show that many finger lines do not fit together perfectly or the image looks blurred with overlapping strips whose image content is averaged, which may be attributed to a slipping process of the finger at right angles to the rolling direction.

Conceivably, the matching of partial images could be improved by known mathematical algorithms for displacements, stretching and rotations, but the computing expenditure for mathematical processes of this type is so high that, given present processor speeds, the computing time for matching the large number of images recorded during the rolling process makes it impossible to record and evaluate the images within a time period comparable to that for rolling. In computing processes of this type, it would be more practical to roll a finger on paper in the standard way and to electronically process the flat fingerprint image made on the paper.

OBJECT AND SUMMARY OF THE INVENTION

For these reasons, it is necessary and an object of the invention to assemble sequentially acquired individual images electronically to form a total image in such a way that falsification due to unwanted movements of the imaged object can be taken into account better than is possible when strip-shaped partial images are fitted together, wherein the method used should also be capable of optimization with respect to shorter computing times compared to the image recording times.

Based on the process mentioned above, this object is met in that a curved intersection line is determined for defining the portions of every image aside from the first image by comparison with the image content of the previously recorded or assembled image $G_{i-1}$, wherein the portion of the image $G_{i-1}$ is defined by this curved intersection line and the corresponding portion of the image $G_i$ is subsequently added to this intersection line to form the total image $G(x, y)$, wherein this intersection line is determined by forming a similarity function $G_c(x, y)$ between the images $G_i$ and $G_{i-1}$, which similarity function $G_c(x, y)$ is external with identical gray values at identical image point coordinates or also by including their surroundings, and the intersection line is formed by a curve $y(x)$ which runs through at least one extreme with a very high similarity of the similarity function $G_c(x, y)$.

Accordingly, proceeding from the apparatus mentioned above, an apparatus is characterized in that the circuit of the image processing device is designed for determining a curved intersection line in order to determine the portions of every image aside from the first image $G_i$ by comparison with the image content of the previously recorded and assembled image $G_{i-1}$, for defining or limiting the portion of the image $G_{i-1}$ through this intersection line and subsequently adding to this intersection line the corresponding portion of the image $G_i$ to form the total image $G(x, y)$, and in that a processor is provided in the circuit which determines this intersection line by forming a similarity function $G_c(x, y)$ between the images $G_i$ and $G_{i-1}$ which is external with identical gray values at identical image point coordinates or also by including their surroundings, and the intersection line is formed by a curve $y(x)$ which, as far as possible, runs through an extreme of very high similarity of the similarity function $G_c(x, y)$.

In contrast to the prior art, a curved intersection line is used for this purpose. A curved intersection line is substantially more suitable for simulating actual conditions because the supporting surface of the finger also has no straight-line boundaries.

Having established this characteristic, model calculations could have been applied for suitable intersection lines instead of the straight-line boundary of the strips according to the prior art in view of the required low computing speed. However, this course is not taken in the present case. On the contrary, the intersection line is obtained by means of a similarity function.

Similarity functions are well known in mathematics. In this case, four different functions are indicated, for example, wherein the alphabetic character s refers to one function and the alphabetic character e refers to another function between which the similarity is described mathematically. The angled brackets around the variables s and e designate an averaging over a predetermined surrounding of an image point by means of which the summing indicated by the addition symbols is also carried out. The functions e and s depend on the coordinates x and y even when this is not expressly noted.

1. Cross-correlation function:

$$r_{xy} = \frac{\sum_i (e_i - \langle e \rangle) \cdot (s_i - \langle s \rangle)}{\sqrt{\sum_i (e_i - \langle e \rangle)^2 \sum_i (s_i - \langle s \rangle)^2}}$$

2. Sum of square differences:

$$d_{xy} = \sum_i (s_i - e_i)^2$$

3. Sum of difference function:

$$d_{xy} = \sum_i |s_i - e_i|$$

4. Sum of differences without averaging:

$$d_{xy} = \sum_i |s_i - e_i - \langle s \rangle + \langle e \rangle|$$

In the cross-correlation function, the denominator is the mean square deviation from the average which is compared with the actual deviation at every point by dividing by the term in the numerator. In areas in which there is no structure, the denominator is a measure of the noise which is accordingly compared with the noise at every image point. In these areas, the cross-correlation function has a value in the order of magnitude of 1. The value can be even higher when the deviation in the numerator is substantially higher than the noise because of different structures in the images represented by e and s. When there are strikingly identical structures, the individual value is equal to the average value, specifically with both functions s and e, so that the cross-correlation function approaches the value zero at which the similarity is accordingly the highest possible.

However, because of the root and the quotients above all, this cross-correlation function is computation-intensive. On the other hand, the second similarity function is processed more quickly because it directly compares the two functions s and e. In the case of a large deviation in the structures, the function value d is very large, which can be attributed, among other reasons, to the square. When the structures correspond, the value of d approaches zero. The value of d is limited to a minimum of zero because of the squaring.

The third similarity function indicated has a form similar to that described above. It contains a sum over the absolute value of difference functions of functions s and e and thus behaves similar to the preceding similarity function. However, it is processed more quickly since no squares need to be formed. Of course, due to the absence of squares, this function does not increase as steeply as the preceding function in cases of dissimilarity. But this is irrelevant in the present instance because the invention is geared toward maximum similarity and the computation accordingly moves essentially in the minimum of the similarity functions.

The last function indicated compares the deviations of average values of functions s and e. In this way, a constant component in the surroundings being considered is compensated and the variations in the structure are more pronounced in the similarity function. In the absence of similarity, this function accordingly also increases more sharply than the preceding function. However, since the process according to the invention is directed to maximum similarity, (s) is approximately (e) in the areas of concern for evaluation of fingerprints, so that no large deviations are expected in relation to the preceding function as a result.

The preceding discussion shows that the selection of the similarity function itself is essentially not at all the issue. Any function which delivers an external value with identical structures and which assumes a value deviating from the extreme in the case of deviations between the structures is suitable for the process according to the invention.

Because of the large number of possible functions, a function by which the computing time can be optimized can also always be found under very different boundary conditions. Therefore, the optimizing possibility required in the stated object of the invention is also achieved according to the invention.

Only a few external points could be referred to for determining the intersection line in order to keep the computing time low. For example, a polynomial could be made through the selected extreme points for determining the intersection line, wherein, for example, the extreme points are selected at the upper image boundary, the lower image boundary and the middle and the polygon is a parabola.

Improved results which unexpectedly work faster than a polynomial approximation by using suitable algorithms is provided according to a preferred further development of the invention in that an intersection line is determined for the curve y(x), wherein the sum of the values of the similarity function $G_c(x, y(x))$ along the curve y(x) is external with respect to similarity.

The improvement in matching partial images can possibly be attributed to the fact that the entire curve is determined through an individual extreme obtained by addition instead of only by several extreme values at individual points as in the polynomial approximation that was mentioned by way of example.

The increased computing speed can possibly be explained in that only addition is carried out in this case instead of the polynomial approximation for an intersection line mentioned above by way of example which would require the matching of n coefficients with formation of powers of n for a polynomial of the nth degree.

According to an advantageous further development, the computing and storing time are reduced in particular in that the similarity function is minimal in the case of similarity of the image contents of the images to be compared, in that a minimum for the intersection line is obtained by the Bellman method in which the curve $y_j(x_i)$ characterized by image points j is selected in each instance for that value $y_j$ with the associated $x_i$ for which a sum S(x, y) is minimal over the entire region, which sum S(x, y) is given recursively from the previous sum values $S(x_{j-1}, y_j)$:

$S(x_j, y_j) = G_c(x_j, y_i)$, the starting value k=1, and for k>1: $S(x_k, y_j) = G_c(x_k, y_i) + \min \{S(x_{k-1}, y_v): i-1 \leq V \leq i+1\}$.

This process is illustrated in more detail in the following with reference to an embodiment example.

According to the process according to the invention, similarity functions could be obtained from the two individual images for determining the intersection lines of two partial images. However, this could cause uncertainty when the intersection line of two individual images intersects the intersection line of the preceding two sectional images, which is certainly possible because a finger will deform when rolled. These difficulties are avoided in a preferred further development of the invention in that, for time ti an instantaneous total image $G_M$ is put together from all of the preceding partial images $G_k$ (k<i), and in that the similarity function is formed with this instantaneous total image $G_M$ by comparison with the partial image $G_i$ recorded at time $t_i$.

The process characterized according to the further development is particularly suitable for optimizing a real-time calculation with minimal storage because not all of the individual images need to be buffered up to the end of the rolling process, after which they are assembled. In this case, only the instantaneous partial image $G_M$ is continued, wherein this instantaneous partial image $G_M$ represents the desired total image of the surface already after the conclusion of the rolling process and after the last recorded partial image has been taken into account computationally.

As was already made clear, certain similarity functions are especially suitable for computer processing. According to a preferred further development of the invention, these similarity function include those in which the similarity function is a function proportional to the absolute value of the difference itself or the difference of the deviation from the average of the gray values, this function being averaged over the surroundings of N×M image points, wherein the extreme to be found is a minimum. Such functions include, for example, the above-mentioned functions $r_{xy}$ and $d_{xy}$.

In particular, it is provided according to an advantageous further development of the process that a similarity function $G_c$ describing the similarity of two functions $F_1$ and $F_2$ is formed by $$G_C(x_i, y_k) = \sum_{v=-N/2}^{N/2} \sum_{\mu=-M/2}^{M/2} |[F_1(x_{i+v}, y_{k+\mu}) - m_1(x_i, y_k)] - [F_2(x_{i+v}, y_{k+\mu}) - m_2(x_i, y_k)],$$

wherein $$m_{1,2}(x_i, y_k) = \frac{1}{(N+1)\cdot(M+1)} \sum_{v=-N/2}^{N/2} \sum_{\mu=-N/2}^{N/2} F_{1,2}(x_{i+v}, y_{k+\mu}) \text{ or is zero,}$$

and for every nth time $t_n$, in particular $F_1=G_n$ and $F_2$ equals $G_{n-1}$ or the gray value function of a total image assembled from all preceding partial images $G_m$(m<n).

These statements about the similarity function correspond to the above nomenclature of the sum of the difference function and the sum of the differences without averaging. As was already mentioned, the latter are especially advantageous for minimizing computing time The summing over the surroundings of N×M image points is carried out in order to balance local structure values such as are given, for example, with the finger lines of the fingertip for determining the optical path. Further, noise participation is reduced by summing.

In individual images with little noise, the computing time can be further reduced. The balancing with respect to minimal structures is achieved not only when the step size of 1 is maintained, as usual, in summing, that is, when all neighboring image points take part in the summing, but, rather, when a larger step size is selected, that is, for example, only every second, fourth and sixth image point is used for summing over the surroundings. Therefore, according to a preferred further development of the invention, in order to reduce the computing time, the step size is greater than a distance between image points in at least one summing.

As was already discussed in detail, it is especially advantageous when smaller structures contribute only a little to the similarity function. Therefore, the structure is "blurred" or balanced by means of summing over N×M image points. Accordingly, it is provided in a preferred further development of the invention that a value greater than one width and, in particular, more than two widths of the minimum structures occurring in the images is selected for N and M, wherein the minimum structure in fingerprint acquisition is the average distance between neighboring finger lines.

Taking into account two widths of the minimal structures in the finger images means an optimal blurring of the structures with minimal computing time as can be illustrated by means of the known sampling theorem. However, providing only one width of the minimum structures occurring in the images has likewise proven suitable in practice and is optimal, above all, in case of reduced structure blurring, in order to keep the computing time short.

As will be appreciated by the person skilled in the art, the computing time essentially depends on the quantity of image points to be accounted for in the image comparison. In order to drastically reduce the number of image points for the subsequent computing process, the calculation of a mask marking the area of the finger that is visible simultaneously in both images is provided. For this purpose, both images are initially put in binary form and the surrounding contour of the black image points is determined. The logical AND operation carried out with the contoured zones of two images supplies the above-mentioned mask which masks the image areas in which subsequent similarity functions and the intersection curve are determined.

While calculation of a mask represents additional computing time, it has turned out that the computing time is drastically reduced by the reduction in the number of image points in subsequent steps, whereas the additional computing expenditure brought about by AND and OR operations in particular is negligible.

Further, the computing time can be greatly reduced when the quantity of images is reduced. However, the number of image points when rolling a finger for recording fingerprints, which is mentioned by way of example, can vary widely depending on how quickly the finger is rolled. In order to limit the quantity of images to a reasonable amount, it is provided according to an advantageous further development of the invention that a central point is determined for every recorded image and an image with a central point distance from the preceding image stored as $G_i$ which is less than a predetermined comparison distance is rejected, that is, is not stored as $G_{i+1}$ and is not taken into account in forming the total image.

It has turned out to be sufficient, particularly in fingerprinting techniques, when a maximum of fifty images are recorded, so that, according to another development of the process according to the invention, it is provided that the comparison distance given beforehand is selected in such a way that a maximum of 50 images are recorded when using the process in the prescribed manner.

The further developments described above involved central point calculations; however, these can be very time-consuming depending on the required computing accuracy. In order to reduce computing time, it is suggested according to an advantageous further development of the invention that a line central point is calculated already during the image readout for every line and the average of the line central points over all lines is used subsequently as a central point for the respective image.

As has already been made clear from the preceding description, this process is especially suitable for the recording of fingerprints by rolling. Consequently, an application of the process is also provided according to the invention in the above-mentioned apparatus for electronic image recording and image processing of fingerprints.

BRIEF DESCRIPTION OF THE DRAWINGS

The invention is described in more detail in the following by means of embodiment examples with reference to the drawing.

DESCRIPTION OF THE PREFERRED EMBODIMENTS

The process and the apparatus mentioned above are suitable for all applications in which a total image is to be assembled from partial images. However, the invention will be described more fully herein exclusively by way of example of the recording of fingerprints by rolling and simultaneous recording of individual images.

Figure 1:
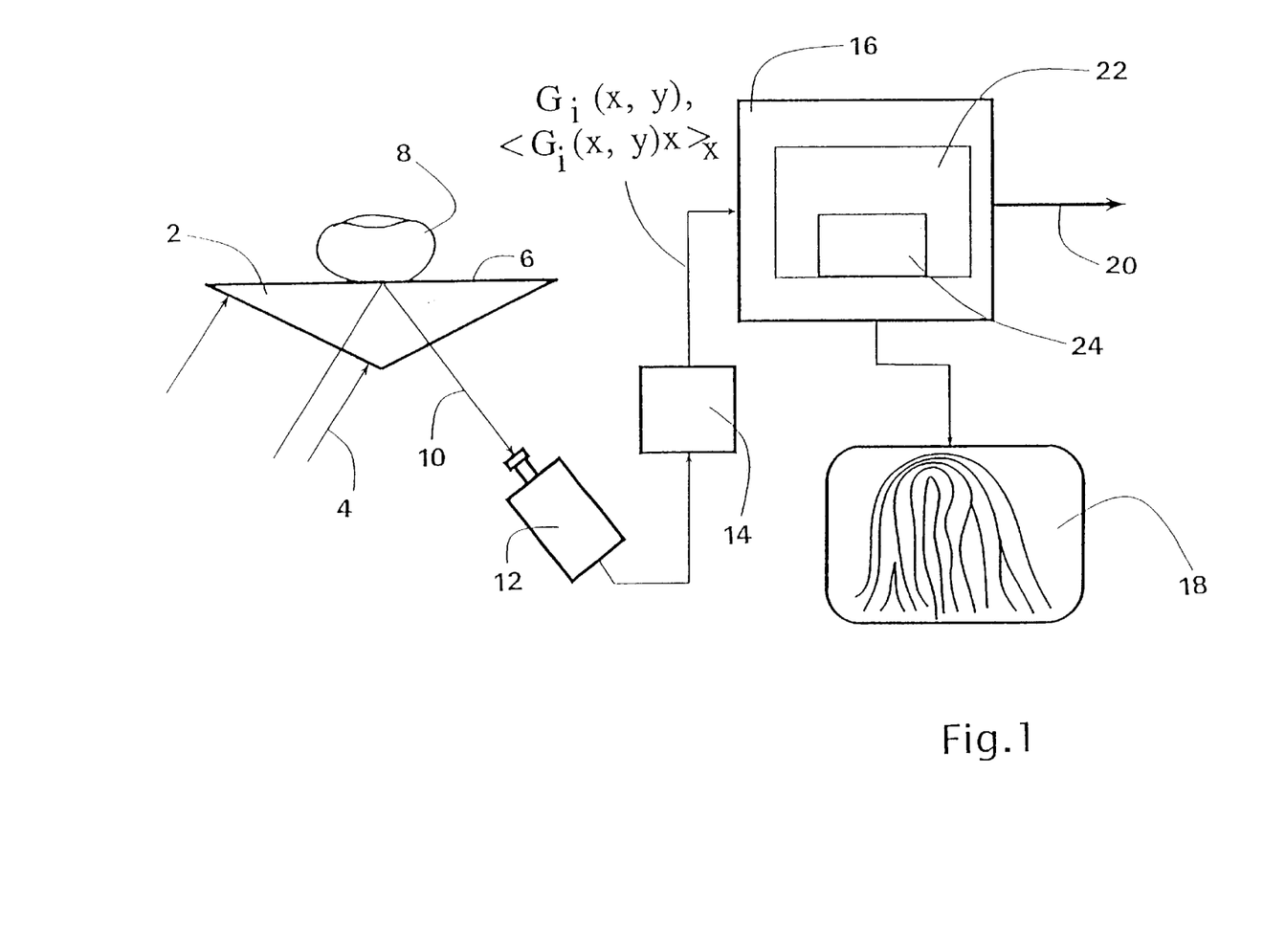
FIG. 1 is a schematic view of an apparatus for recording fingerprints.

In the known finger rolling technique, a glass body 2, preferably in the form of a prism, is usually used to roll a finger 8 on a surface 6. A light bundle 2 is directed through the glass body 2 from below onto the surface 6. The angle of the light bundle 4 is selected in such a way that total reflection occurs at the surface 6. The grooves between the finger lines of the finger 8 shown by way of example accordingly appear light in the total-reflecting light bundle 10, while the total reflection is interrupted at locations where finger lines are supported and the light can escape from the surface. Accordingly, as when rolled with ink, the finger lines become darker than the surroundings. This black-and-white image of the finger lines is recorded from the surface 6 by a camera 12, especially a CCD camera. As is customary with CCD cameras, the image content $G_i$ (x, y) is read out line-by-line from a CCD matrix. The gray values that are read out are then supplied to an image processing device 16 via an interface 14. For this purpose, the camera 12 is oriented in such a way that the rolling direction is correlated to the line direction x of the CCD matrix. This orientation makes it possible for the interface 14, when reading out a line, to calculate the central point of the line at the same time by means of a processor in that an average is taken from the products of the gray value and associated x-coordinates. The line central points determined in this way can then be further processed by the image processing device 16.

The camera 12 stores the instantaneous image content during each recording in CCDs which are then read out sequentially. This means that the entire process of rolling the finger 8 on the surface 6 takes the form of a large number of images which can be displayed as gray value functions $G_i(x, y)$, wherein the index i refers to the respective individual image. Further, the coordinates x and y are the horizontal and vertical directions in the readout from the CCD matrix and G is the respective gray value of the individual image at the indicated coordinates x and y.

Consequently, the central point described above is characterized in the line direction by the term $<G_i(x, y) x>_x$. The transfer of these functions and the gray value function is indicated graphically in FIG. 1.

The image processing device 16 uses the data sent to it, on the one hand, for displaying the instantaneous rolling image $G_M$ resulting at the end of the total image G on a monitor 18 on which additional information is also displayed such as the quality of the rolling process, so that the user can decide whether or not the recorded fingerprint is usable. The quality is determined, for example, from the external values for the path as determined according to the invention and described more fully in the following with reference to FIG. 3 and FIG. 4.

Further, the image processing device 16 also has a readout possibility 20 by which fingerprint data can also be printed out or sent to other locations. It has been shown to be more advantageous to transmit recorded fingerprints of suspected violators from the apparatus directly to a central bureau, especially via modem, and to compare them with data stored at the central bureau than for the fingerprint to be printed first and subsequently sent by fax or mail.

The image processing device 16 essentially contains a circuit 22 in which the data of individual images $G_i(x, y)$ are combined to form a total image and are prepared for display on the monitor 18 and for generating signals for the output device 20. Further, for the process steps which are to be described more fully in the following and which are based, among other things, on mathematical operations, a processor 24 by which computing operations can be executed in a simple manner is arranged in the circuit 22.

It has been shown that the computing speed of conventional PCs is sufficient for carrying out an evaluation in time segments that are comparable to the recording time for fingerprinting of approximately 2 to 5 seconds in the process described in the following which is also optimized with respect to computing time.

Figure 2:
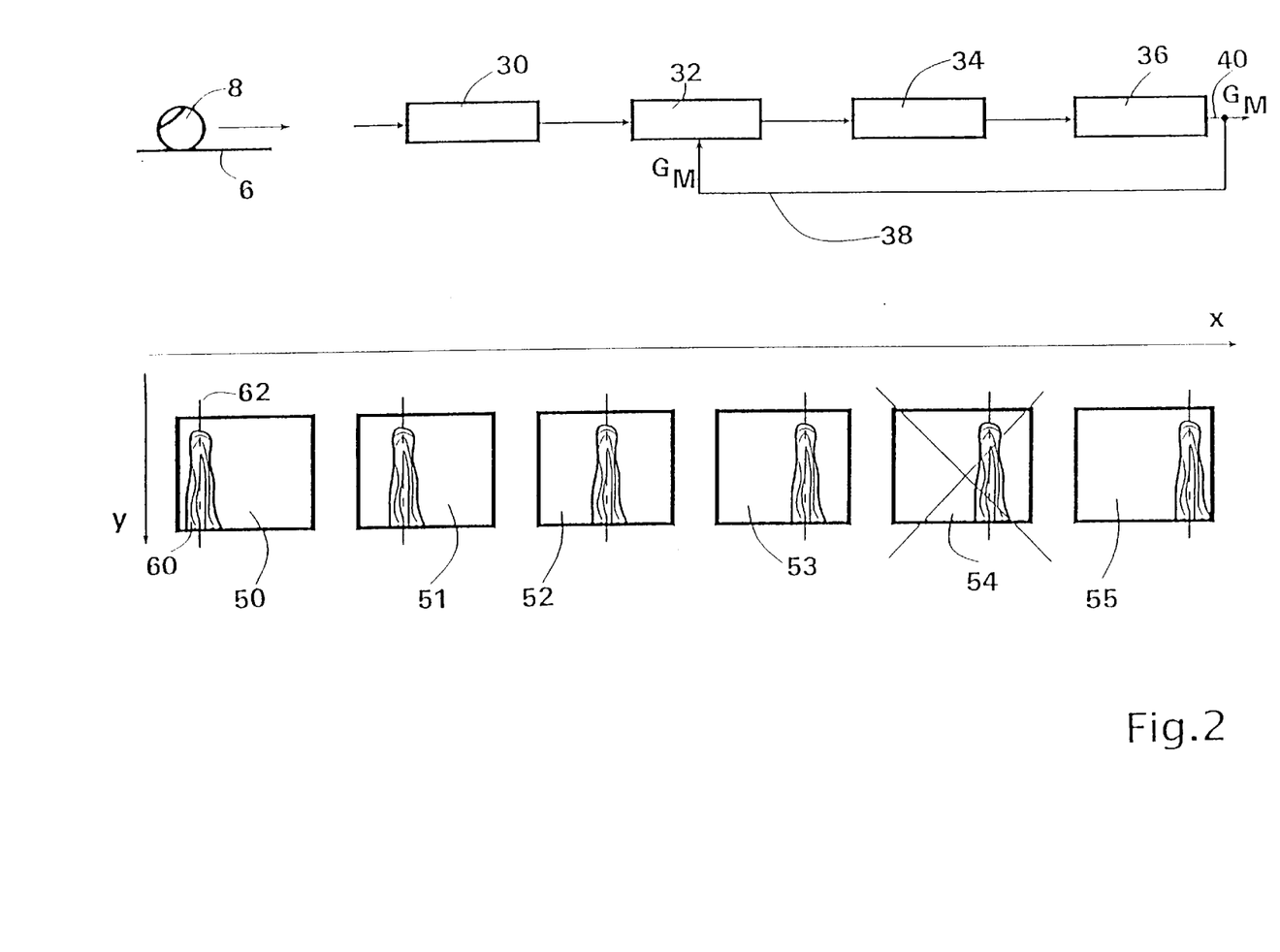
FIG. 2 is a schematic view illustrating the recording of individual images when rolling a finger, including image selection.

FIG. 2 shows, schematically, individual process steps carried out by the processor 24 in the circuit 22. The finger 8 is recorded sequentially in a plurality of individual images $G_i(x, y)$ by rolling on the rolling surface 6; this is shown by block 30. The subsequent block 32 carries out the calculation of a similarity function, whereupon a path is searched in block 34 by which the partial images are joined together. Subsequently, the partial images are assembled in block 36 to form a total image.

In particular, a similarity function, already mentioned above, is not obtained from successive images in block 32; rather, each individual image is compared with the instantaneous total image $G_M$ for all images which were previously joined together according to the process. This is shown in FIG. 2 by a return line 38 for the instantaneous total image $G_M$. At the end of the process, the instantaneous total image $G_M$ is equal to the total image G to be obtained, according to which all partial images are assembled. This is displayed on the monitor 18 or is sent via the output 20, for example.

The individual steps will now be described more fully. In the bottom part of FIG. 2, six partial images 50, 51, 52, 53, 54 and 55 are shown for further clarification of the operation of block 30. Further, the associated coordinate axis x is indicated in the rolling direction and y is indicated in the direction vertical thereto.

The individual images 50, 51, 52, 53, 54 and 55 show schematically a structure 60 which is always identical. This does not correspond to actual conditions when rolling, since different shapes of the structures 60 occur when the finger is pressed with varying degrees of force. However, for schematic illustration, identical structures 60 are shown in FIG. 2 to illustrate the selection of sequential images in order to limit the quantity of individual images to be evaluated without depending on the speed at which the finger 8 is rolled on the surface 6.

For this purpose, an average central point line 62 is formed. This line is located in the x-direction at the location given by $$\frac{\sum_k \sum_i G(x_i, y_k)x_i}{\sum_k \sum_i G(x_i, y_k)},$$

the line central points $<G(x, y) x>_x$ averaged over y. This location is characterized in the images 50 to 55 by a dashed line 62.

The positions of the central point lines 62 of successive partial images are compared for selecting the individual images to be evaluated. When the distance between the given individual image 54 and the preceding image 53 is less than a determined threshold value, the data of the individual image 54 are rejected as is indicated by the cross-out part shown in FIG. 2. Due to the absence of the individual image 54, only the individual images 50, 51, 52, 53 and 55 are further processed for forming the similarity function in block 32. In so doing, the numbering of index i is effected so as to skip the individual image 54. The individual image 55 accordingly contains the incremented value of the index of the individual image 53 as index i.

The images recorded in this manner with function $G_i(x, y)$ are subsequently subjected to a similarity test in block 32 and a path search in block 34 as is indicated in more detail with reference to FIG. 3.

Figure 3:
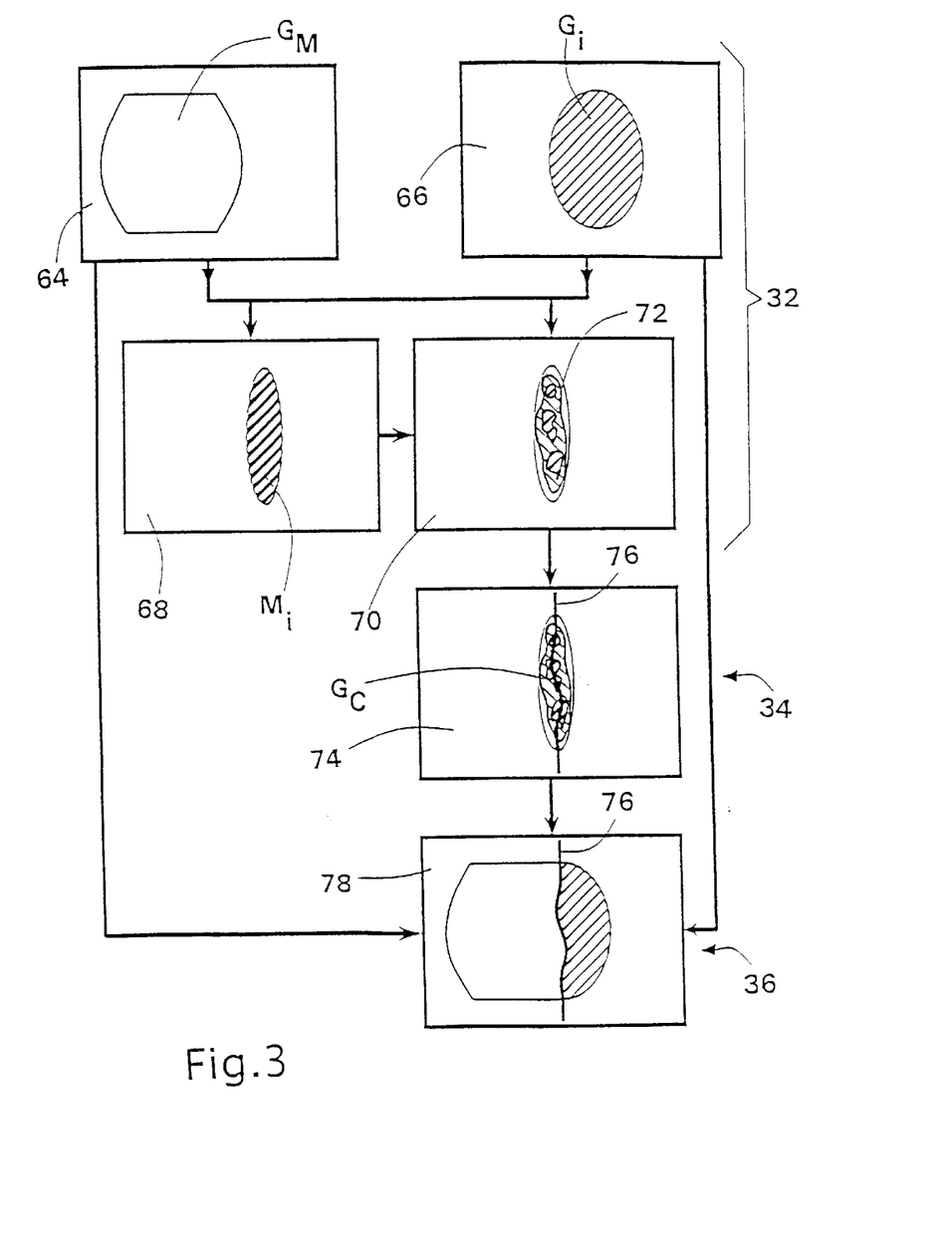
FIG. 3 is a schematic illustration of an embodiment example for a process for assembling partial images to form a total image.

FIG. 3 shows the contour of an instantaneous total image $G_M$ in a block 64 which has been assembled from all partial images up to $G_{i-1}$ which is supplemented by the process steps described in the following by the individual image $G_i$ shown schematically in block 66 as a contour.

The images in blocks 64 and 66 are initially put in binary form by a suitable threshold value. Subsequently, a closed contour surrounding all binary image points is searched in each of the resulting images. Familiar methods for this purpose are already known from image processing literature. The logical AND operation carried out on the contoured zones then supplies the value 1 for points within the searched mask $M_i$ (image 68) while the rest of the image points receive the value 0. $M_i$ accordingly determines the working area for similarity analysis and path search.

This mask is calculated in that a contour is determined whose absolute value of the difference of images $G_i$ and $G_M$ is equal to a determined threshold value or changes with respect to the neighboring image point by exceeding or falling below the threshold value, wherein the values of logical one are assigned in the area inside the contour and the value zero is assigned outside of the contour with line-by-line interrogation. Such methods are known from the technical field of software development.

The logical values of the mask $M_i$ are subsequently applied to the absolute amount of the difference of the image contents of $G_M$ and $G_i$, so that a marked image is formed as is shown inside block 70. Image points outside of the contour are set at the possible binary maximum value as shown in image 70.

Structures 72 such as those occurring in a similar manner in fingerprints are shown schematically in the image shown in block 70. However, smaller structures like finger lines would also occur, which would interfere with the path search shown in the following with reference to block 74. Therefore, in image 72, every image point is averaged by a surrounding predetermined by M*N image points. This gives the following similarity function used in the embodiment example:

$$G_C(x_i, y_k) = \sum_{v=-N/2}^{N/2} \sum_{\mu=-M/2}^{M/2} |[G_M(x_{i+v}, y_{k+\mu})] - [G_i(x_{i+v}, y_{k+\mu})]|.$$

When M and N=8, the structures given based on the finger lines are sufficiently well balanced. The path search in the similarity image which then supplies an external path 76 is explained in more detail in the following.

Given similar functions, the similarity function used in this case has the external value 0; that is, a minimum search is to be carried out in this case for determining the extreme path. In the embodiment example, this was carried out using the Bellman method. This method was described in detail in the articles by R. Bellman, "Dynamic Programming", Princeton University Press, Princeton, N.J., 1957, and R. Bellman, "Dynamic Programming and Self-Adaptive Rule Processes", R. Oldenbourg Verlag, Munich, 1967. Essentially, it consists in that a coefficient field is described with the image 72. The first line is accordingly no longer changed; the second and subsequent lines are progressively summed recursively, namely, by adding to each value in the relevant line the smallest neighbor of the preceding line. After this has been carried out for every line, the sums for minimum paths are present in the last line. The smallest sum is found from the latter and traced back for adjoining fields with the smallest sums, so that the searched path is determined as function y(x).

This method is sufficiently accurate and works very efficiently. Problems could arise when the path through passes constant areas in the similarity image because the curve is not uniquely determined. However, the algorithm always provides a unique path for the process because, in areas in which the similarity function is constant, every path is assessed as equally good for fingerprint construction.

Figure 4:
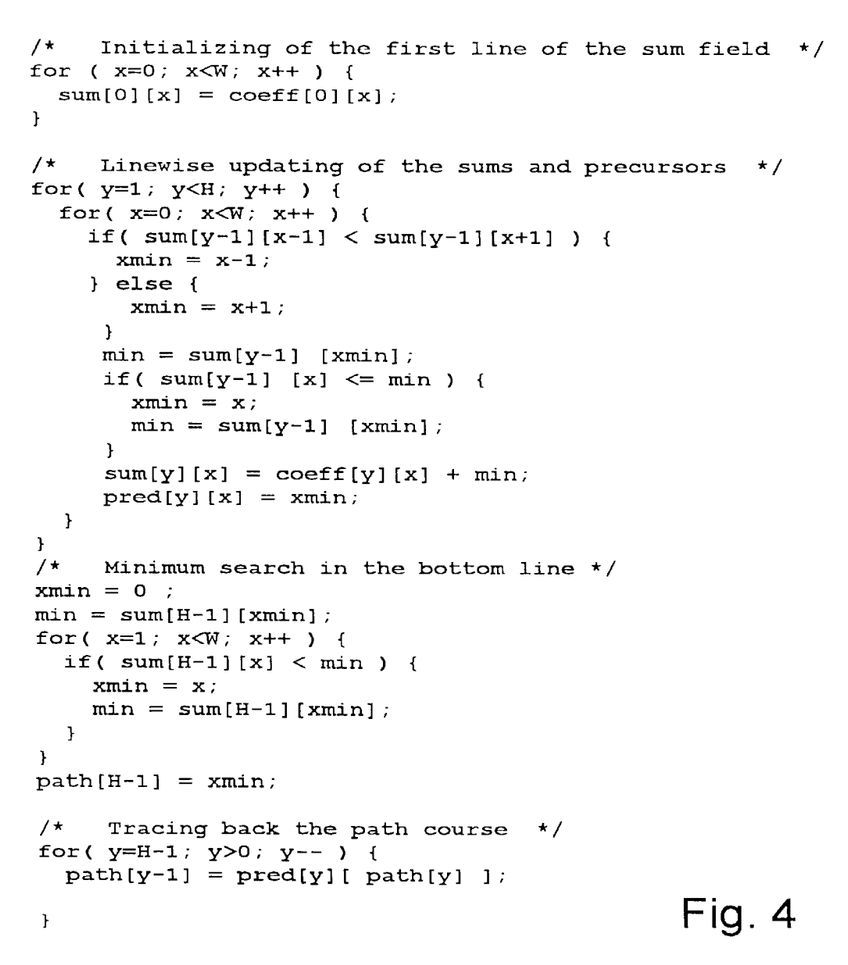
FIG. 4 shows a program for calculating the external path by way of example.

A program example written in C programming language is indicated by way of example in FIG. 4 to illustrate the method to make clear to the person skilled in the art how this method works.

The indicated variables have the following meanings:
coeff [H] [W] coefficient field (similarity image $G_i$, the field indexing starts with 0)
sum [H] [W] sum field (coefficient sums)
pred [H] [W] field of precursor points
path [H] x-coordinates of the optimal path (interfaces or points of contact)
min auxiliary variable (minimum sum)
xmin auxiliary variable (x-coordinate of the minimum)

The path 76, as shown in bock 78, is then used to cut off image $G_M$ on the right side and image $G_i$ on the left side and to join the two parts in order to form a new total image $G_M$ After assembling all individual images $G_i$, a total image G (x, y) is obtained which corresponds more closely to the rolled fingerprint than is possible with the prior art in which the $G_i$ were cut along straight lines and joined together.

Many variations of the embodiment example are possible. For example, with a very fast processor or a transputer network which permits a faster parallel processing of image points, the masking with mask $M_i$ can be dispensed with, wherein the total image $G_i$ in block 70 is accordingly used without masking. Further, it is also possible in the case of correspondingly low or high computing speeds to select the threshold value for image selection that was described with reference to the bottom part of FIG. 2 for a greater or smaller number of images.

In the embodiment example, the threshold value was determined in such a way that the quantity of images to be processed corresponded to approximately 50 images. In this way, it was possible to calculate and image rolled fingerprints with sufficient accuracy within ten seconds.

A further reduction in processor times can be expected by means of faster processors, networks, e.g., transputers, or also by optimizing threshold values and parameters such as numbers M and N. With respect to averaging over the surroundings M*N, the computing time can likewise be substantially reduced, for example, when a step size greater than 1 is provided when summing over the surroundings or when a corresponding network for forming the sums of the surroundings in the line direction is used in the interface 14 when processing according to numbers.

What is claimed is:

1. A process for the electronic recording of an image of the surface of an object, which image can be displayed as a function G(x, y), wherein x and y are the coordinates of a respective image point of the image and G designates its gray value, wherein the object is recorded sequentially over different times $t_i$, where $t_{i+1} > t_i$, from different perspectives as function $G_i$ in order to form the total image G from the individual images $G_i(x, y)$ wherein portions are cut out of the individual images and joined together depending on the respective recorded view, comprising the steps of:

determining a curved intersection line for defining the portions of every image aside from the first image $G_i$ by comparison with the image content of the previously recorded or assembled image $G_{i-1}$;

the portion of the image $G_{i-1}$ being defined by said curved intersection line and the corresponding portion of the image $G_i$ being subsequently added to this intersection line to form the total image G (x, y);

said intersection line being determined by forming a similarity function $G_c(x, y)$ between the images $G_i$ and $G_{i-1}$, which similarity function $G_c(x, y)$ is external with identical gray values at identical image point coordinates or also by including their surroundings; and said intersection line being formed by a curve y (x) which runs through at least one extreme with a very high similarity of the similarity function $G_c(x, y)$;

wherein an intersection line is determined for the curve y(x), wherein the sum of the values of the similarity function $G_c(x, y(x))$ over the curve y(x) is external with respect to the similarity.

2. The process according to claim 1, wherein the similarity function is minimal in the case of similarity of the image contents of the images to be compared, in that a minimum for the intersection line is obtained by the Bellman method in which the curve $y_j(x_i)$ characterized by image points j is selected in each instance for that value $y_j$ with the associated $x_i$ for which a sum S(x, y) is minimal over the entire region, which sum S(x, y) is given recursively from the previous sum values $S(x_{j+1}, y_j)$ by:

$S(x_j, y_j) = G_c(x_j, y_i)$, the starting value k=1, and for k1: $S(x_k, y_j) = G_c(x_k, y_i) + \min \{S(x_{k-1}, y_v) : i-1 \leq v \leq i+1\}$.

3. The process according to claim 1, wherein for time $t_i$, an instantaneous total image $G_M$ is put together from all of the preceding partial images $G_k$ (k<i), and in that the similarity function is formed with this instantaneous total image $G_M$ by comparison with the partial image $G_i$ recorded at time $t_i$.

4. A process for the electronic recording of an image of the surface of an object, which image can be displayed as a function G(x, y), wherein x and y are the coordinates of a respective image point of the image and G designates its gray value, wherein the object is recorded sequentially over different times $t_i$, where $t_{i+1}>t_i$, from different perspectives as function $G_i$ in order to form the total image G from the individual images $G_i(x, y)$ wherein portions are cut out of the individual images and joined together depending on the respective recorded view, comprising the steps of:

determining a curved intersection line for defining the portions of every image aside from the first image $G_i$ by comparison with the image content of the previously recorded or assembled image $G_{i-1}$;

the portion of the image $G_{i-1}$ being defined by said curved intersection line and the corresponding portion of the image $G_i$ being subsequently added to this intersection line to form the total image G (x, y);

said intersection line being determined by forming a similarity function $G_c(x, y)$ between the images $G_i$ and $G_{-1}$, which similarity function $G_c(x, y)$ is external with identical gray values at identical image point coordinates or also by including their surroundings; and said intersection line being formed by a curve y (x) which runs through at least one extreme with a very high similarity of the similarity function $G_c(x, y)$;

wherein the similarity function is a function proportional to the absolute value of the difference itself or the difference of the deviations from the average of the gray values, this function being averaged over the surroundings of N×M image points, wherein the extreme to be found is a minimum.

5. The process according to claim 4, wherein a similarity function $G_c$ describing the similarity of two functions $F_1$ and $F_2$ is formed by $$G_C(x_i, y_k) = \sum_{v=-N/2}^{N/2} \sum_{\mu=-M/2}^{M/2} |[F_1(x_{i+v}, y_{k+\mu}) - m_1(x_i, y_k)] - [F_2(x_{i+v}, y_{k+\mu}) - m_2(x_i, y_k)]|,$$

wherein $$m_{1,2}(x_i, y_k) = \frac{1}{(N+1)\cdot(M+1)} \sum_{v=-N/2}^{N/2} \sum_{\mu=-N/2}^{N/2} F_{1,2}(x_{i+v}, y_{k+\mu}) \text{ or is zero,}$$

and for every nth time $t_n$, in particular $F_1=G_n$ and $F_2$ equals $G_{n-1}$ or the gray value function of a total image $G_M$ assembled from all preceding partial images $G_m$(m<n).

6. The process according to claim 5, wherein the step size is greater than a distance between image points in at least one summing.

7. The process according to claim 4, wherein a value greater than one width of the minimum structures occurring in the images is selected for N and M, wherein the minimum structure in fingerprint acquisition is the average distance between neighboring finger lines.

8. The process according to claim 4, wherein a value greater than two widths of the minimum structures occurring in the images is selected for N and M, wherein the minimum structure in fingerprint acquisition is the average distance between neighboring finger lines.

9. A process for the electronic recording of an image of the surface of an object, which image can be displayed as a function G(x, y), wherein x and y are the coordinates of a respective image point of the image and G designates its gray value, wherein the object is recorded sequentially over different times $t_i$, where $t_{i+1}>t_i$, from different perspectives as function $G_i$ in order to form the total image G from the individual images $G_i(x, y)$ wherein portions are cut out of the individual images and joined together depending on the respective recorded view, comprising the steps of:

determining a curved intersection line for defining the portions of every image aside from the first image $G_i$ by comparison with the image content of the previously recorded or assembled image $G_{i-1}$;

the portion of the image $G_{i-1}$ being defined by said curved intersection line and the corresponding portion of the image $G_i$ being subsequently added to this intersection line to form the total image G (x, y);

said intersection line being determined by forming a similarity function $G_c(x, y)$ between the images $G_i$ and $G_{i-1}$, which similarity function $G_c(x, y)$ is external with identical gray values at identical image point coordinates or also by including their surroundings; and said intersection line being formed by a curve y (x) which runs through at least one extreme with a very high similarity of the similarity function $G_c(x, y)$;

wherein a zone is determined prior to calculation of the similarity function, in which zone the absolute value of the difference of the two gray values of two images at every image point is less than a predetermined threshold value, a mask is generated for this zone, the images are masked by this mask by a logical AND operation, and the similarity function and intersection line are determined exclusively in the masked zone.

10. A process for the electronic recording of an image of the surface of an object, which image can be displayed as a function G(x, y), wherein x and y are the coordinates of a respective image point of the image and G designates its gray value, wherein the object is recorded sequentially over different times $t_i$, where $t_{i+1}>t_i$, from different perspectives as function $G_i$ in order to form the total image G from the individual images $G_i(x, y)$ wherein portions are cut out of the individual images and joined together depending on the respective recorded view, comprising the steps of:

determining a curved intersection line for defining the portions of every image aside from the first image $G_i$ by comparison with the image content of the previously recorded or assembled image $G_{i-1}$;

the portion of the image $G_{i-1}$ being defined by said curved intersection line and the corresponding portion of the image $G_i$ being subsequently added to this intersection line to form the total image G (x, y);

said intersection line being determined by forming a similarity function $G_c(x, y)$ between the images $G_i$ and $G_{i-1}$, which similarity function $G_c(x, y)$ is external with identical gray values at identical image point coordinates or also by including their surroundings; and said intersection line being formed by a curve y (x) which runs through at least one extreme with a very high similarity of the similarity function $G_c(x, y)$;

wherein a central point is determined for every recorded image and an image with a central point distance from the preceding image stored as $G_i$ which is less than a predetermined comparison distance is rejected, that is, is not stored as $G_{i+1}$ and is not taken into account in forming the total image.

11. The process according to claim 10, wherein the comparison distance given beforehand is selected in such a way that a maximum of 50 images are recorded when using the process in the prescribed manner.

12. The process according to claim 10, wherein a line central point is calculated for every line during image readout and the average of the line central points over all lines is used subsequently as a central point for the respective image.

* * * * *